(12) United States Patent
Saito

(10) Patent No.: US 7,707,628 B2
(45) Date of Patent: Apr. 27, 2010

(54) NETWORK SYSTEM, INTERNAL SERVER, TERMINAL DEVICE, STORAGE MEDIUM AND PACKET RELAY METHOD

(75) Inventor: Kazuo Saito, Tokyo (JP)

(73) Assignee: Fuji Xerox Co., Ltd., Tokyo (JP)

(*) Notice: Subject to any disclaimer, the term of this patent is extended or adjusted under 35 U.S.C. 154(b) by 1495 days.

(21) Appl. No.: 11/039,812

(22) Filed: Jan. 24, 2005

(65) Prior Publication Data

US 2006/0031929 A1 Feb. 9, 2006

(30) Foreign Application Priority Data

Aug. 4, 2004 (JP) ............................. 2004-227617

(51) Int. Cl.
G06F 15/16 (2006.01)
G06F 17/00 (2006.01)
H04L 29/06 (2006.01)

(52) U.S. Cl. ...................... 726/11; 713/153; 713/154; 709/223

(58) Field of Classification Search .................... 726/11
See application file for complete search history.

(56) References Cited

U.S. PATENT DOCUMENTS

| | | | | |
|---|---|---|---|---|
| 4,972,481 | A * | 11/1990 | Santesson | 380/264 |
| 5,826,029 | A | 10/1998 | Gore, Jr. et al. | |
| 5,944,823 | A | 8/1999 | Jade et al. | |
| 6,061,797 | A | 5/2000 | Jade et al. | |
| 6,820,204 | B1 * | 11/2004 | Desai et al. | 726/6 |
| 7,055,173 | B1 * | 5/2006 | Chaganty et al. | 726/11 |
| 7,216,368 | B2 * | 5/2007 | Ishiguro | 726/32 |

(Continued)

FOREIGN PATENT DOCUMENTS

CN 1480872 A 3/2004

(Continued)

OTHER PUBLICATIONS

Oostendrop, Karen A. Badger, L. Vance, C. D. Morrison, W. G. Petkac, M.J. Sherman, D. L. Sterne, D. F. "Domain and Type Enforcement Firewalls". Computer Security Applications Conference. Pub. Dec. 1997. Relevant pp. 122-132. Found on the World Wide Web at: http://ieeexplore.ieee.org/stamp/stamp.jsp?tp=&arnumber=646182&isnumber=14094.*

(Continued)

*Primary Examiner*—William R Korzuch
*Assistant Examiner*—Jeremiah Avery
(74) *Attorney, Agent, or Firm*—Oliff & Berridge, PLC (57) ABSTRACT

A network system has a firewall that connects an external network and an internal network. A terminal device is provided on the external network. An application server is provided on the internal network and provides data to the terminal device based on a request from the terminal device. An external server is provided on a DMZ of the firewall or on the external network, and relays communication between the terminal device and the application server based on the request from the terminal device through an internal server. The internal server is provided on the internal network, and relays communication between the external server and the application server. The internal server has an encrypting unit that encrypts the packet in such a manner that an encrypted packet is able to be decrypted only by the terminal device.

9 Claims, 4 Drawing Sheets

U.S. PATENT DOCUMENTS

| | | |
|---|---|---|
| 7,272,639 B1 * | 9/2007 | Levergood et al. .......... 709/218 |
| 7,353,533 B2 * | 4/2008 | Wright et al. .................. 726/1 |
| 7,395,536 B2 * | 7/2008 | Verbeke et al. .............. 718/100 |
| 7,404,207 B2 * | 7/2008 | Perry .......................... 726/15 |
| 2002/0078371 A1 * | 6/2002 | Heilig et al. ................ 713/200 |
| 2002/0161904 A1 | 10/2002 | Tredoux et al. |
| 2003/0091030 A1 | 5/2003 | Yegin et al. |
| 2003/0092425 A1 | 5/2003 | Okazaki et al. |
| 2003/0204601 A1 | 10/2003 | Takano |
| 2003/0229805 A1 * | 12/2003 | Perry .......................... 713/200 |
| 2004/0123153 A1 * | 6/2004 | Wright et al. ............... 713/201 |
| 2005/0044197 A1 * | 2/2005 | Lai ............................ 709/223 |
| 2006/0031927 A1 | 2/2006 | Mizuno et al. |
| 2006/0265689 A1 * | 11/2006 | Kuznetsov et al. .......... 717/117 |

FOREIGN PATENT DOCUMENTS

| | | |
|---|---|---|
| CN | 1703030 A | 11/2005 |
| JP | A-10-512696 | 12/1998 |
| JP | A-2000-505270 | 4/2000 |
| JP | A-2001-318842 | 11/2001 |
| JP | A 2002-140239 | 5/2002 |
| JP | A-2003-050756 | 2/2003 |
| JP | A-2003-218954 | 7/2003 |
| JP | A-2003-324484 | 11/2003 |

OTHER PUBLICATIONS

English-language translation of Chinese Office Action.

Dec. 15, 2009 Office Action issued in Japanese Patent Application No. 2004-227617 (with translation).

* cited by examiner

NETWORK SYSTEM, INTERNAL SERVER, TERMINAL DEVICE, STORAGE MEDIUM AND PACKET RELAY METHOD

BACKGROUND OF THE INVENTION

1. Field of the Invention

The present invention relates to a network system where a terminal device on an external network and an application server on an internal network communicate with each other via a firewall connected between the external network and the internal network.

2. Description of the Related Art

In accompaniment with the spread of the Internet environment, the number of companies is increasing whose internal network is connected to an external network such as the Internet so that data can be transmitted to and received from the company via e-mail or the Web (HTTP).

Environments in which external networks like the Internet can be remotely accessed using a wireless LAN or PHS are also rapidly becoming more widespread.

In the midst of such environments, the demand has arisen for company employees to want to access the internal network of their own company from places outside the company. Conventionally, as means for responding to this demand, a dial-up facility has been prepared in the company. However, because the speed of dial-up connections is slow and costs are incurred, recently networks called VPN (Virtual Private Network) and SSL-VPN (Secure Socket Layer-Virtual Private Network) have come to be used to enable a user to connect to the internal network of the user's company from the Internet. In this case, for example, a server called a reverse proxy, which is disposed at the node between the internal network, such as a corporate LAN, and the Internet, and which relays access from the external network to a device in the network such as a Web server, is also sometimes used.

A VPN is a network where a private network is constructed on a shared network (e.g., the Internet). In a VPN, an encrypted channel is secured between a point A and a point B connected over the Internet to create a condition as if the two points were connected through a dedicated line. Thus, when a personal client PC connects to the Internet and accesses a VPN device disposed in the DMZ (demilitarized zone) of the company firewall, the personal client PC and the VPN device communicate with each other using an encrypted protocol, so that the user can safely use the internal network as if the client PC were connected to the network inside the company. However, in this case, it is necessary to dispose a VPN device (server) in the company and to dispose client software in the client PC.

An SSL-VPN is a network which attempts to provide functions similar to a VPN without installing special client software in the client PC in order to more easily access the resources in the company. In order to access the data within the company, ordinarily a Web browser pre-installed in the client PC is used. The method of accessing the data is limited to the range accessible with the Web browser, but because various corporate applications have recently come to be realized with a Web base, this often does not become that much of a problem from a practical standpoint. Thus, SSL-VPNs have been gaining attention particularly recently. Also, in contrast to a VPN which, when a client PC is connected in the VPN, can create a condition as if the client PC were connected directly to the corporate network, an SSL-VPN can be set so that only a predetermined Web server can be accessed even if connected. Thus, this is preferable from the standpoint of security.

It is common for a corporate network to be connected to an external network via a firewall in order for the corporate network to be protected from unauthorized access from the Internet or the like. With a firewall, the kinds of packets passed between the Internet and the corporate network can be set in detail. It is common for the firewall to be set so that common protocols such as HTTP and HTTPS are allowed to pass from the corporate network to the Internet and so that other protocols do not pass from the Internet to the corporate network.

However, because both VPNs and SSL-VPNs are networks for accessing the corporate network from the Internet, it is necessary to change the firewall settings to allow access to the corporate network from the Internet. There are also numerous cases where a company decides that changing the firewall settings is not permissible because doing so would pose a security threat.

In this regard, the SWANStor® access method of Japanese Patent Application Laid-Open Publication (JP-A) No. 2002-140239 has been devised. This invention is configured by two servers: an internal server within a corporate network, and the Internet or an external server disposed in the DMZ of a firewall. Connection requests are invariably sent from the internal server to the external server. Specifically, connection requests continue to be periodically sent from the internal server to the external server, to create a state where the servers are pseudo-continuously connected. Thus, the corporate network can be accessed from the Internet ordinarily without having to change the firewall settings.

Thus, when a client PC on the Internet connects to the external server and sends a request to connect to the corporate server, the external server transmits the request from the outside user to the internal server as a response to the connection request from the internal server.

Because the internal server is disposed on the corporate network, the internal server can normally access the corporate server. The internal server connects to the corporate server and sends the returned result to the external server. As a result, the external server sends internal data to the outside client PC, whereby the outside client PC can access the corporate server.

Moreover, a method has been proposed where data can be safely transmitted on a communication path between a client PC of a user and an external server, and between an external server and an internal server, using an encryption protocol called SSL (Secure Socket Layer), because the data is encrypted. Thus, an outside company employee can safely access the corporate server using a client PC, without the need for the firewall settings to be changed.

With this method, the problem arises that "absolute address information for identifying a specific server" is included in the data returned from the corporate server.

Namely, when address information identifying a specific corporate server, such as "http://intra.foo.var.co.jp/index.htm", is included in the data returned from the internal server, and when the user selects that address information, the corporate server naturally cannot be directly accessed from the Internet. Thus, the problem arises that the error message "Server cannot be located" is displayed in the Web browser.

In this regard, processing to change the absolute address has already been proposed. Namely, when absolute address information is included in data to be transferred to the outside, the absolute address information is changed to address information passing through the external server. For example, assuming that the address of the external server is "https://outside.abc.net", the address is changed to "https://outside-.abc.net/intra.php?="http://intra.foo.var.co.jp/index.htm". When the address is changed in this manner, the external server receives that request, interprets the address designated by the argument to be the address to the corporate server, and sends a connection request to the corporate server.

However, even with this method, the following problems arise.

Namely, in the above method, the external server and the internal server, and the external server and the client PC, are connected using SSL, but the data sent from the internal server to the external server is temporarily decrypted by the external server, and is then again encrypted by the external server and sent to the client. Thus, unencrypted data is momentarily present on the external server.

When unencrypted data is present on the external server, for example, when the external server is operated on a service site that an independent service provider operates and that external server is shared by internal servers of several companies, confidential data of those companies that has not been encrypted remains on the service site, even if momentarily. From the standpoint of security, this leads to an undesirable situation because safety with respect to leakage of the data is entrusted to the management of the operating company.

SUMMARY OF THE INVENTION

The present invention has been made in view of the above circumstances and provides a data access method allowing data to be accessed from an external network without the need for the firewall settings to be changed, where data exchanged between an external network and an internal network is not left on an external server in an unencrypted state.

According to an aspect of the present invention there is provided a network system comprising a firewall connected between an external network and an internal network; a terminal device present on the external network; an application server present on the internal network, the application server configured to supply desired data to the terminal device in response to a request from the terminal device; an external server present on a DMZ of the firewall or on the external network, the external server configured to receive a request from the terminal device to connect to the application server and relay communication between the terminal device and the application server; and an internal server present on the internal network, the internal server configured to relay communication between the external server and the application server, with communication between the external server and the internal server being permitted only by a session established on the basis of a connection request from the internal server to connect to the external server, and with the external server relaying the request from the terminal device for connection to the application server as a response to the connection request from the internal server, wherein the internal server includes receiving unit that receives a packet for the terminal device from the application server; encrypting unit arranged to conduct, with respect to the received packet, encryption that can be decrypted by only the terminal device; and transmitting unit arranged to transmit the encrypted packet to the external server via the firewall, and wherein the external server includes receiving unit arranged to receive the packet encrypted by the internal server; and transmitting unit arranged to transmit intact the received encrypted packet to the terminal device without decrypting the encrypted packet.

According to the present invention, the internal server conducts, with respect to the received packet destined for the terminal device, encryption that can be decrypted only by the terminal device, and transmits the encrypted packet to the external server via the firewall. The external server receives the packet encrypted by the internal server and transmits, as is to the terminal device, the encrypted packet without decrypting the encrypted packet. Thus, in the external server that is present on the DMZ of the firewall or on the external network and which general users can access, the packet from the internal network reaches the terminal device on the external network without being inadvertently decrypted. Therefore, security can be improved over cases where the packet is temporarily decrypted by the external server.

BRIEF DESCRIPTION OF THE DRAWINGS

Various exemplary embodiments of a system and method of the present invention will be described in detail below with reference to the accompanying drawings, in which.

DESCRIPTION OF THE EMBODIMENTS

A first embodiment of the invention will now be described using the drawings.

Figure 1:
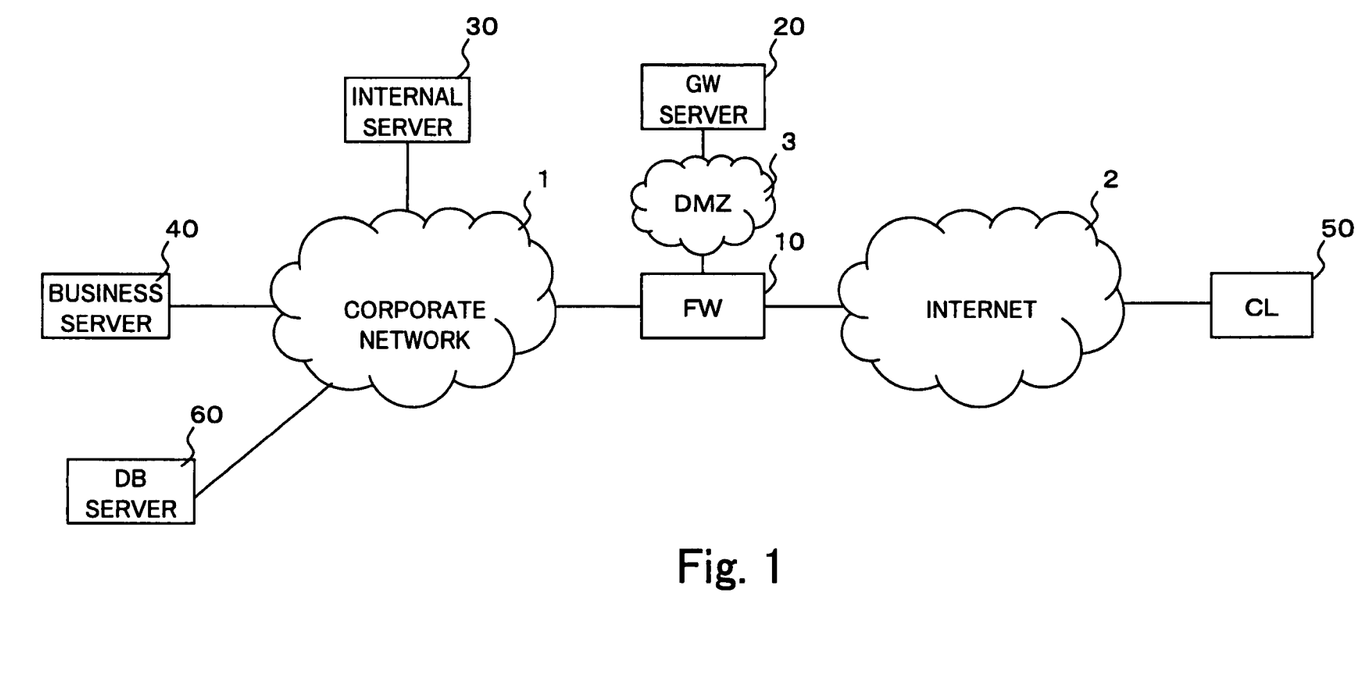
FIG. 1 is a diagram showing the network configuration of a network system in first and second embodiments.

FIG. 1 is a diagram showing the network configuration of a network system of the first embodiment. The network system of the first embodiment is configured by three networks—a corporate network 1, the Internet 2 and a demilitarized zone (DMZ) 3—centered around a firewall 10. This system is mainly for accessing a business server 40 on the corporate network 1 from a terminal device 50 on the Internet 2, so that the terminal device 50 can receive desired services from the business server 40.

The corporate network 1 in FIG. 1 is an internal network accessible only by specific users. The Internet 2 is an external network accessible by general users. The DMZ 3 is a network that is isolated from, and relays communication between, the corporate network 1 and the Internet 2.

The firewall 10 is a security device which ensures that only the necessary services are provided to the user by trapping all connection request packets with respect to other networks transmitted from the corporate network 1 and the Internet 2 and arbitrarily prohibiting or allowing those packets to pass, security. The firewall 10 of the first embodiment is set to allow connection request packets from the corporate network 1 to an outside network (the DMZ 3, the Internet 2) if the protocol used is HTTP or HTTPS, and to prohibit connection request packets from an outside network to the corporate network 1 with respect to all protocols.

A gateway (GW) server 20 is disposed on the DMZ 3. The GW server 20 is a relay device that receives packets from the terminal device 50 on the Internet 2 destined for the corporate network 1 and transfers those packets to the corporate network 1, and which receives packets from the corporate network 1 destined for the terminal device 50 and transfers those packets to the terminal device 50. In the first embodiment, an example is described where the GW server 20 is disposed on the DMZ 3, but the GW server 20 may also be disposed on a network other than the corporate network 1, such as the Internet 2.

An internal server 30 is disposed on the corporate network 1. The internal server 30 is a relay device that receives, from the GW server 20 via the firewall 10, packets from the terminal device 50 on the Internet 2 destined for the corporate network 1 and transfers those packets to the business server 40 designated by the terminal device 50, and which receives packets from the business server 40 destined for the terminal device 50 and transfers those packets to the GW server 20 via the firewall 10.

The business server 40 is an application server that provides desired Web-based services to the terminal device 50 and the like.

The terminal device 50 is a common personal computer, and is a client terminal device connected to the Internet 2 wirelessly or with a cable.

A database (DB) server 60 is one communication device that plays a supplementary role with respect to the services that the business server 40 provides. For example, the DB server 60 has a reference-destination address displayed on a Web screen that the business server 40 provides, and when the terminal device 50 accesses that reference-destination address, the DB server 60 provides additional data to the terminal device 50.

When the terminal device 50 on the Internet 2 accesses the business server 40 on the corporate network 1 in the network system configured in this manner, the terminal device 50 communicates with the business server 40 via the GW server 20 and the internal server 30.

However, as described above, the transmission of connection request packets from the GW server 20 to the internal server 30 is prohibited by the settings of the firewall 10. Thus, when the GW server 20 receives a request from the terminal device 50 to connect to the business server 40, that connection request packet is destroyed by the firewall 10 even if the GW server 20 transmits the connection request packet to the internal server 30 in order to establish a session with the relay-destination internal server 30. Thus, the terminal device 50 cannot communicate with the business server 40 unless something else is done.

Thus, in the first embodiment, the GW server 20 and the internal server 30 are configured so that a session between the GW server 20 and the internal server 30 is continually maintained by a connection request from the internal server 30, so that the internal server 30 can pseudo-receive the connection request packet from the GW server 20. The technology for ensuring that the internal server 30 can pseudo-receive the connection request packet from the GW server 20 without changing the settings of the firewall 10 may be realized by, for example, the technology described in JP-A No. 2002-140239.

In the network system configured in this manner, when absolute address information for accessing a communication device such as the DB server 60 present on the corporate network 1 is included in the packet that the business server 40 provides in response to the request from the terminal device 50, the connection to that communication device ends up being denied as a result of the settings of the firewall 10 even if the terminal device 50 tries to directly access the communication device on the corporate network 1 on the basis of that absolute address information.

In order to circumvent this situation, when absolute address information is included in the packet, the absolute address information has conventionally been rewritten, in the GW server 20 relaying communication between the terminal device 50 and the business server 40, to absolute address information via the GW server 20, so that attempts by the terminal device 50 to directly connect to the reference-destination communication device described in the absolute address information are prevented.

However, with this method, there is the potential for security problems to arise because even if the packet sent from the internal server 30 to the GW server 20 is encrypted in the internal server 30, the packet ends up being temporarily decrypted in the GW server 20 present on the DMZ 3 that terminal devices of general users on the Internet can access.

Thus, in the first embodiment, the internal server 30 changes the absolute address information and encrypts the packet so that the packet can only be decrypted by the terminal device 50. Specifically, processing is conducted in each device so that the internal server 30 and the terminal device 50 are pseudo-directly connected by SSL on the communication path where the internal server 30 and the terminal device 50 are connected via the GW server 20. Thus, in the GW server 20, it becomes unnecessary to decrypt the packet because the absolute address information is changed, and security can be improved.

The procedure where the terminal device 50 on the Internet 2 communicates with the business server 40 on the corporate network 1 will be described in further detail below using FIG. 2. In the first embodiment, a URL is used as identification information for clearly identifying each device on the network. Specifically, the URL of the GW server 20 is "https://gw.foo.net," the URL of the internal server 30 is "https://srv.bar.co.jp," and the URL of the business server 40 is "https://intra.abc.bar.co.jp."

Figure 2:
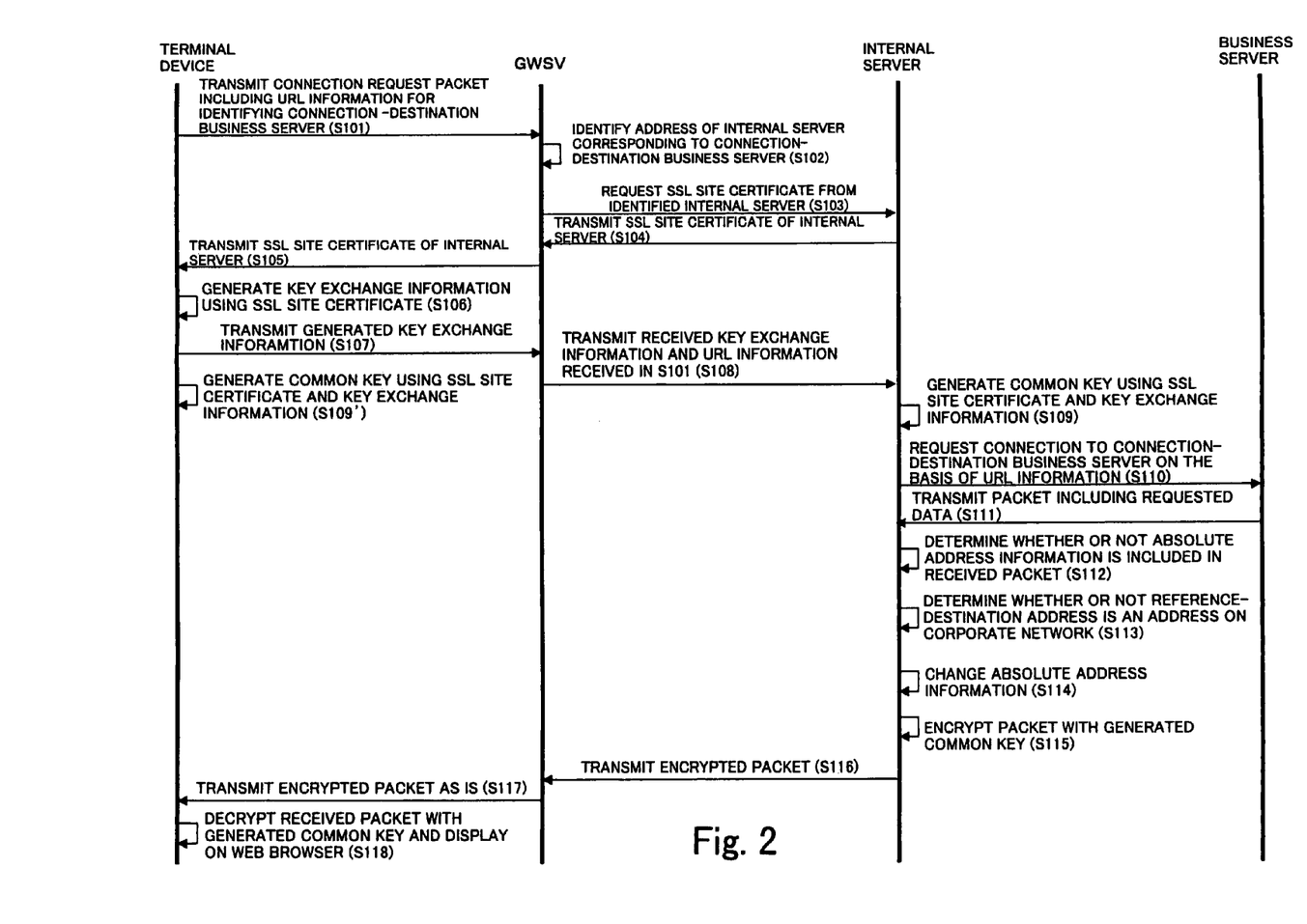
FIG. 2 is a diagram showing a procedure where an Internet terminal device communicates with a business server on a corporate network in the first embodiment.

Referring now to FIG. 2, first, the terminal device 50 transmits a connection request packet to the GW server 20 in order to initiate communication with the business server 40 (S101). In order to identify the connection-destination business server, "https://gw.foo.net/http://intra.abc.bar.co.jp" is described as URL information in the connection request packet.

The GW server 20 waits to receive the connection request packet from the terminal device 50 on the Internet 2. Then, when the GW server 20 receives the connection request packet from the terminal device 50, the GW server 20 references the information following its own address in the URL information described in the packet (i.e., in the case of this example, "http://intra.abc.bar.co.jp," which is described after "https://gw.foo.net") to identify the address of the internal server 30 with respect to the business server 40 (S102). The address of the internal server 30 may be identified in accordance with the following rule, for example. Namely, the address "srv.bar.co.jp", where the specific host name "srv" is added to the domain name "bar.co.jp", is identified as the address of the internal server 30. The addresses of internal servers with respect to each business server may also be associated and registered in advance in a database on the GW server 20, 50 that when the database is referenced in each case, the address of the internal server with respect to the connection-destination business server is identified. After the GW server 20 identifies the address of the internal server 30 in this manner, the GW server 20 requests an SSL site certificate with respect to that internal server 30 (S 103).

The internal server 30 whose SSL site certificate has been requested transmits its own SSL site certificate to the GW server 20 (S104). It will be noted that the network system may also be configured so that the SSL site certificate of the internal server 30 is registered in advance in the memory of the GW server 20, so that the GW server 20 does not request the SLL site certificate with respect to the identified internal server 30 in each case. Thus, the URL information of the server serving as the target is embedded in the SSL site certificate, and whether or not the URL information in the SSL certificate matches the URL to which the terminal device 50 is connected is checked by the terminal device 50. It will be assumed that the URL information of the GW server 20 is embedded in advance in the SSL certificate used here (however, it will be assumed that the secret key with respect to the site certificate is managed only by the internal server 30 that actually conducts encryption). Thus, because that to which the terminal device 50 is connected is the GW server 20, it can pass the check of the URL conducted by the terminal device 50.

Next, the GW server 20 transmits the received SSL site certificate of the internal server 30 to the terminal device 50 (S105).

The terminal device 50 uses the received SSL site certificate to execute the same protocol procedure as a conventional SSL, generate key exchange information (S106), and transmit that key exchange information to the GW server 20 (S107).

When the GW server 20 receives the key exchange information, it transmits that key exchange information and the URL information received in S101 to the internal server 30 (S108).

When the internal server 30 receives this information, it uses its own SSL site certificate and the received key exchange information to generate a common key (S109). The terminal device 50 also uses the SSL site certificate and the key exchange information to generate a common key using the same procedure as the internal server 30 (S109'). Thereafter, the terminal device 50 and the internal server 30 use this common key to transmit and receive encrypted packets to and from each other.

Then, the internal server 30 transmits a connection request packet with respect to the address "http://intra.abc.bar.co.jp" of the business server 40 described in the received URL information (S110). On the basis of this connection request packet, a session is established between the internal server 30 and the business server 40, and the business server 40 transmits, to the internal server 30, a packet including the data requested by the terminal device 50 (S111).

When the internal server 30 receives this packet, it determines whether or not absolute address information is included in the HTML expression data included in the packet (S112). If absolute address information is included, the internal server 30 determines whether or not the URL of the reference destination (access destination) described in that absolute address information is that of the corporate network 1 (S113). As a result of the determination, when absolute address information is included, the internal server 30 changes the absolute address information to via the GW server 20 (S114). Specifically, for example, when the absolute address information included in the HTML expression data is "http://intra2.abc.bar.co.jp/public/index.htm", the internal server 30 determines whether or not the URL of the reference destination is that of the corporate network 1 by comparing the domain of the server name, and when the URL is that of the corporate network 1, the internal server 30 adds the URL "https://gw.foo.net" of the GW server 20 to which the internal server 30 is currently connected to the head of that URL to change the address to the absolute address information "https://gw.foo.net/http://intra2.abc.co.jp/public/index.htm". Because the internal server 30 changes the absolute address information in this manner, the terminal device 50 does not access the corporate network 1 directly but through the GW server 20. Thus, the drawback that the corporate network 1 cannot be accessed from the terminal device 50 present on the Internet 2 can be eliminated.

Next, when absolute address information where the reference destination is that of the corporate network 1 is included in the packet received from the business server 40, the internal server 30 uses the common key generated in S109 to encrypt the packet whose absolute address information has been changed (S115) and transmits the encrypted packet to the GW server 20 (S116). Although not illustrated in FIG. 2, when absolute address information where the reference destination is that of the corporate network 1 is not included in the packet, the internal server 30 encrypts, as is, the packet received from the business server 40 and transmits it to the GW server 20.

Next, the GW server 20 transmits, as is, the packet to the terminal device 50 without decrypting the received packet (S117) The terminal device 50 uses the common key generated in S109' to decrypt the received packet and displays the result on the Web browser (S118).

According to the first embodiment, even if the reference destination of the absolute address information embedded in an HTML document provided by the business server 40 is an address on the corporate network 1, the information is changed to address information via the GW server 20. Thus, the terminal device 50 directly accesses the corporate network 1, so that the access can be prevented from being denied.

Also, because the packet exchanged between the business server 40 and the terminal device 50 is encrypted by the common key generated between the internal server 30 and the terminal device 50, the packet is not decrypted by the GW server 20 relaying the packet between the internal server 30 and the terminal device 50. Thus, security can be improved because data that has inadvertently not been encrypted is not present on the GW server 20 that general users can access.

Moreover, when the absolute address information is changed by the internal server 30 as in the first embodiment, it is unnecessary to introduce special software in the terminal device 50, so that time and effort for setting the terminal device 50 can be reduced.

The changing of the absolute address information may also be conducted by the terminal device rather than the internal server. In this case, even when numerous terminal devices are present, the changing of the address information is conducted by each terminal device, so that the processing burden on the internal server can be reduced.

Next, a case where the absolute address information is changed by the terminal device will be described as a second embodiment of the invention using the drawings.

In the second embodiment, the absolute address information is changed by the terminal device 50 by adding a function in advance to the Web browser incorporated in the terminal device 50, or by storing a special Helper program (a program that processes designated mime-type data) in advance in the memory of the terminal device 50 and using the CPU disposed in the terminal device 50 to read that program in each case.

Figure 3:
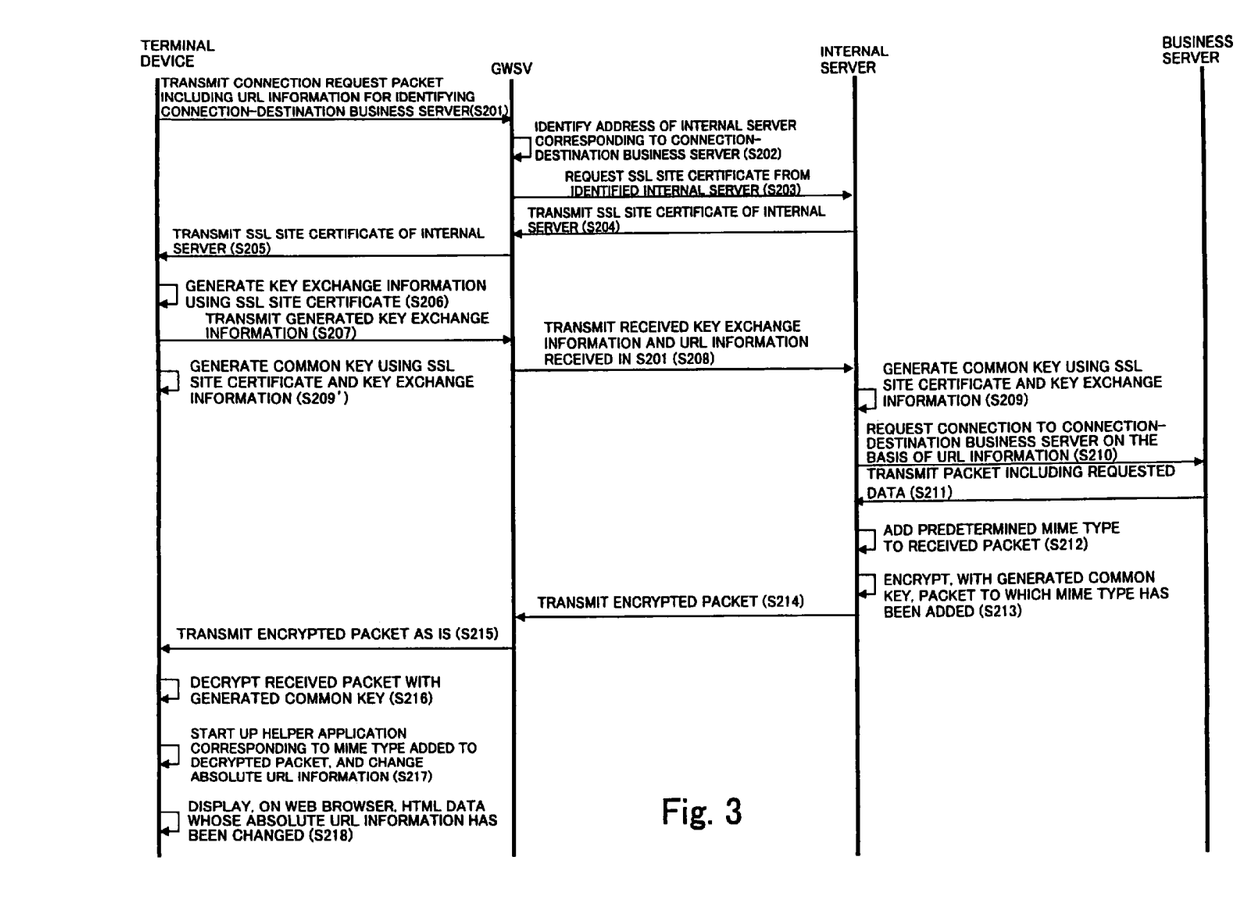
FIG. 3 is a diagram showing a procedure where the Internet terminal device communicates with the business server on the corporate network in the second embodiment.

Here, in the second embodiment, the procedure where the terminal device 50 on the Internet 2 communicates with the business server 40 on the corporate network 1 will be described using FIG. 3. S201 to S211 will be described briefly because they are the same as S101 to S111 of the first embodiment, and S212 to S218 will be described in detail.

First, the terminal device 50 transmits a connection request packet to the GW server 20 in order to initiate communication with the business server 40 (S201). The GW server 20 receives the connection request packet from the terminal device 50, references the information following its own address in the URL information described in the packet, and identifies the address of the internal server 30 with respect to the business server 40 (S202). Then, the GW server 20 requests an SSL site certificate with respect to the identified internal server 30 (S203). The internal server 30 whose SSL site certificate has been requested transmits its own SSL site certificate to the GW server 20 (S204).

Next, the GW server 20 transmits the received SSL site certificate of the internal server 30 to the terminal device 50 (S205). The terminal device 50 uses the received SSL site certificate to generate key exchange information (S206) and transmits that key exchange information to the GW server 20 (S207) When the GW server 20 receives the key exchange information, it transmits that key exchange information and the URL information received in S201 to the internal server 30 (S208).

When the internal server 30 receives this information, it uses its own SSL site certificate and the received key exchange information to generate a common key (S209). The terminal device 50 also uses the SSL site certificate and the key exchange information to generate a common key using the same procedure as the internal server 30 (S209'). Then, the internal server 30 transmits a connection request packet with respect to the address "http://intra.abc.bar.co.jp" of the business server 40 described in the received URL information (S210). On the basis of this connection request packet, a session is established between the internal server 30 and the business server 40, and the business server 40 transmits, to the internal server 30, a packet including the data requested by the terminal device 50 (S211).

Moreover, after the internal server 30 receives, from the business server 40, the packet including the data requested by the terminal device 50, the internal server 30 adds a predetermined mime type (e.g., "application/x-special-ssl-vpn") to the data portion of the received packet and encrypts the packet with the common key generated in S209 (S213). Then, the internal server 30 transmits the encrypted packet to the GW server 20 (S214). The GW server 20 transmits, as is, the packet to the terminal device 50 without decrypting the packet received via the firewall 10 from the internal server 30.

The terminal device 50 encrypts the received packet with the common key generated in S209' (S216), references the mime type added to the packet, starts up a Helper application corresponding to the mime type, and changes the absolute address information (S217).

The changing of the absolute address information by the Helper application is conducted as follows, for example.

Namely, in a case where the absolute address information is "http://intra2.abc.bar.co.jp/public/index.htm", first the terminal device 50 determines whether or not that URL is a URL present on the corporate network 1 by comparing the domain of the corporate network 1 with the domain of the server name to which the terminal device 50 initially tried to connect. When the URL is a URL present on the corporate network 1, the terminal device 50 adds the URL "https://gw.foo.net" of the GW server 20 to which the terminal device 50 is currently connected to the head of the URL and changes the information to the absolute address information "https://gw.foo.net/http://intra2.abc.bar.co.jp/public/index. htm".

Then, the terminal device 50 displays, on the Web browser, the HTML data whose absolute address information has been changed in this manner (S218). Although not illustrated in FIG. 3, when absolute address information where the reference destination is that of the corporate network 1 is not included in the packet, the terminal device 50 may display, as is on the Web browser, the HTML data included in the received packet without starting up the Helper application.

According to the second embodiment, the user designates the address corresponding to the absolute address information displayed on the browser, and the terminal device 50 is connected via the GW server 20 even when a connection request is conducted with respect to that address. Thus, the connection is prevented from being denied due to the connection being directly requested of the corporate network 1.

In the second embodiment also, similar to the first embodiment, because the packet exchanged between the business server 40 and the terminal device 50 is encrypted by the common key generated between the internal server 30 and the terminal device 50, the packet is not decrypted by the GW server 20 relaying the packet between the internal server 30 and the terminal device 50. Thus, security can be improved because data that has inadvertently not been encrypted is not present on the GW server 20 that general users can access.

In the first or second embodiment, if it is necessary to authenticate the user when the terminal device 50 connects to the corporate network 1 via the GW server 20, the GW server 20 may request user information, such as a user ID and password, with respect to the terminal device 50 when the terminal device 50 transmits the connection request packet to the GW server 20. The user authentication may also be conducted by transferring user information to the internal server 30 from the GW server 20 using the Lightweight Directory Access Protocol (LDAP) or the like in the internal server 30, without the user authentication being conducted by the GW server 20. Moreover, the user authentication may also be conducted with a certificate in a public key encryption method rather than with a user ID and password.

Figure 4:
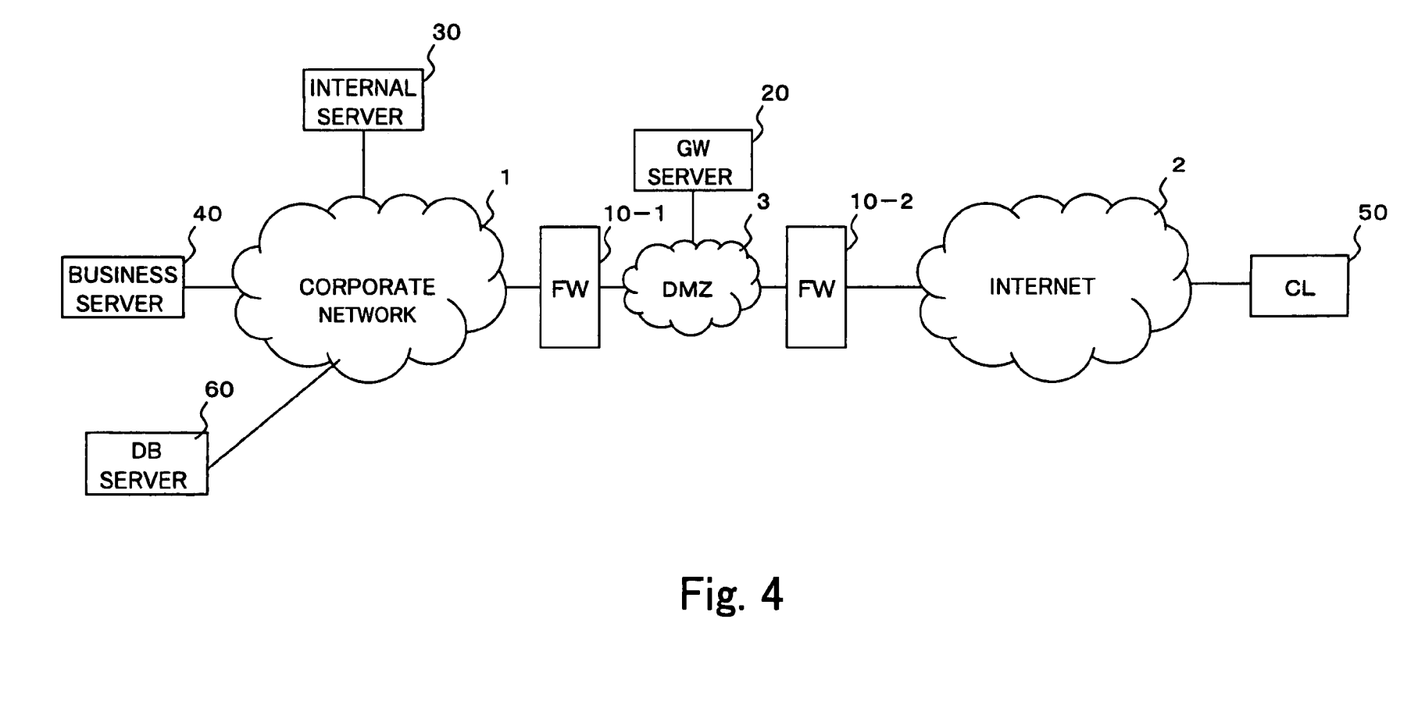
FIG. 4 is a diagram showing an example of a network configuration applicable to the network system of the first and second embodiments.

Also, in the first and second embodiments, an example where a DMZ was constructed by one firewall 10 as shown in FIG. 1 was described, but the firewall is not limited to one. For example, as shown in FIG. 4, the invention is also applicable to a case where a DMZ is constructed using two firewalls.

Moreover, the object of the invention may also be achieved by supplying, to a system or device, a storage medium in which is stored a software program that realizes the functions of the above embodiments, so that a computer of the system or device (e.g., a CPU or an MPU) reads and executes the program code stored in the storage medium.

In this case, the program code itself read from the storage medium realizes the functions of the above embodiments, and the storage medium in which the program code is stored configures the invention. As the storage medium for supplying the program code, a floppy disk, a hard disk, an optical disk, an optical-magnetic disk, a CD-ROM, a CD-R, magnetic tape, a nonvolatile memory card, or a ROM can be used.

The invention also includes cases where, rather than the functions of the above embodiments being realized as a result of the program code that the computer has read being executed, an OS (operating system) running on the computer conducts part or all of the actual processing on the basis of an instruction in the program code, so that the functions of the above embodiments are realized by that processing.

Moreover, the invention also includes cases where, after the program code read from the storage medium is written in a memory disposed in a function expansion board inserted into the computer or function expansion unit connected to the computer, a CPU disposed in the function expansion board or function expansion unit conducts part or all of the actual processing on the basis of an instruction in the program code, so that the functions of the above embodiments are realized by that processing.

According to one aspect of the network system pertaining to the invention, the internal server includes determining unit that determines whether or not absolute address information for accessing a communication device present on the internal network is included in the packet received by the receiving unit, and changing unit that changes the absolute address information to via the external server when absolute address information is included, and the encrypting unit conducts, with respect to the packet whose absolute address information has been changed, encryption that can be decrypted only by the reception-destination terminal device when absolute address information is included.

According to this invention, when absolute address information for accessing a communication device present on the internal network is included in the received packet, the internal server changes the absolute address information to via the external server, and then encrypts and transmits the packet to the external server. Thus, when the terminal device on the external network receives the packet from the corporate network and accesses a communication device present on the internal network on the basis of the absolute address information included in that packet, the terminal device accesses the communication device via the external server, so that the terminal device directly accesses the communication device on the internal network, whereby access can be prevented from being denied as a result of the settings of the firewall.

According to an aspect of the network system pertaining to the invention, the terminal device includes receiving unit that receives the packet that the application server has transmitted, determining unit that determines whether or not absolute address information for accessing a communication device present on the internal network is included in the packet received by the receiving unit, and changing unit that changes the absolute address information to via the external server when absolute address information is included.

According to this invention, when the terminal device receives the packet including the absolute address information for accessing a communication device present on the internal network, the terminal device changes that absolute address information to via the external server. Thus, when the terminal device on the external network receives the packet from the corporate network and accesses a communication device present on the internal network on the basis of the absolute address information included in that packet, the terminal device accesses the communication device via the external server. Thus, the terminal device directly accesses the communication device on the internal network, whereby access can be prevented from being denied as a result of the settings of the firewall.

While illustrative and presently embodiments of the present invention have been described in detail herein, it is to be understood that the inventive concepts may be otherwise variously embodied and employed and that the appended claims are intended to be construed to include such variations except insofar as limited by the prior art.

The entire disclosures of Japanese Patent Application No. 2004-227617 filed on Aug. 4, 2004 including specification, claims, drawings, and abstract is incorporated herein by reference.

What is claimed is:

1. A network system, comprising:
a firewall that connects an external network and an internal network;
a terminal device being provided on the external network;
an application server being provided on the internal network, the application server that provides data to the terminal device based on a request from the terminal device; and
an external server being provided on a DMZ of the firewall or on the external network, the external server configured to receive a request from the terminal device to connect to the application server and relay communication between the terminal device and the application server through an internal server;
the internal server being provided on the internal network, the internal configured to relay communication between the external server and the application server,
the internal server further, comprising:
a receiving unit that receives a packet for the terminal device from the application server;
an encrypting unit that encrypts the packet in such a manner that an encrypted packet is able to be decrypted only by the terminal device; and
a transmitting unit that transmits the encrypted packet to the external server via the firewall,
the external server further comprising:
a receiving unit that receives the packet encrypted by the internal server; and
a transmitting unit that transmits the received encrypted packet to the terminal device,
wherein
decryption of the received encrypted packet is suppressed in the external server by changing an absolute address information for accessing a communication device,
communication between the external server and the internal server is permitted when a session is established based on a connection request from the internal server to connect to the external server, and
the external server relays the request from the terminal device for connection to the application server through the internal server as a response to the connection request from the internal server,
wherein the internal server or the terminal device further comprises:
a determining unit that determines whether or not the packet received by the receiving unit contains the absolute address information for accessing the communication device, the communication device including the application server or a database server connected to the internal network, the database server providing additional information to the terminal device, and
a changing unit that changes the absolute address information to address information via the external server when absolute address information is contained in the packet received by the receiving unit.

2. The network system according to claim 1, wherein when the internal server comprises the determining unit and the changing unit, the encrypting unit encrypts the packet whose address information is changed by the changing unit, in such a manner that an encrypted packet is able to be decrypted only by the terminal device.

3. The network system according to claim 1, the terminal device further comprising:
a receiving unit that receives a packet transmitted from the application server.

4. An internal server being provided on an internal network, the internal server communicating with an external server via a firewall connected between an external network and the internal network, the external server being provided on a DMZ of the firewall or on the external network, the internal server comprising:
a receiving unit that receives a packet for a terminal device from an application server, the terminal device being provided on the external network;
a determining unit that determines whether or not the packet received by the receiving unit contains absolute address information for accessing a communication device, the communication device being provided on the internal network and including the application server or a database server, the database server providing additional information to the terminal device; and a changing unit that changes the absolute address information to address information via the external server when the absolute address information is contained in the packet received by the receiving unit, an encrypting unit that encrypts the packet in such a manner that an encrypted packet is able to be decrypted only by the terminal device; and a transmitting unit that transmits the encrypted packet to the external server, wherein decryption of the received encrypted packet is suppressed in the external server by changing the absolute address information, communication between the external server and the internal server is permitted when a session is established based on a connection request from the internal server to connect to the external server, and the internal server relays a request from the terminal device for connection to the application server through the external server as a response to the connection request.

5. The internal server according to claim 4, wherein the encrypting encrypts the packet whose address information is changed by the changing unit, in such a manner that an encrypted packet is able to be decrypted only by the terminal device when the absolute address information is contained.

6. A computer-readable storage medium that stores a program for controlling an internal server by use of a computer, the internal server being present on an internal network that communicates, via a firewall connected between an external network and an internal network, with an external server present on a DMZ of the firewall or on the external network, with communication with the external server being permitted only by a session established on the basis of a request from the internal server to connect to the external server, due to access restriction settings of the firewall, and with the internal server relaying to an application server on the internal server a request from a terminal device on the external network to connect to the application server relayed via the external server, in response to the internal server's request to connect to the external server, the program drives the internal server to execute under control of the computer comprising:

receiving a packet destined for the terminal device on the external network from the application server;

determining whether or not the received packet contains absolute address information for accessing a communication device present on the internal network;

changing the absolute address information to address information via the external server when the absolute address information is contained;

encrypting the packet whose address information is changed by the changing unit, in such a manner that an encrypted packet is able to be decrypted only by the terminal device when the absolute address information is not contained; and transmitting the encrypted packet to the external server, wherein decryption of the encrypted packet is suppressed in the external server by changing the absolute address information.

7. A packet relay method for relay processing of a packet on a network system, the network system including a firewall connected between an external network and an internal network; a terminal device present on the external network; an application server present on the internal network, the application server that provides data to the terminal device in response to a request from the terminal device; an external server present on a DMZ of the firewall or on the external network, the external server that receives the request from the terminal device to connect to the application server and relays communication between the terminal device and the application server; and an internal server present on the internal network, the internal server that relays communication between the external server and the application server, with communication between the external server and the internal server being permitted only by a session established on the basis of a connection request from the internal server to connect to the external server, and with the external server relaying the request from the terminal device for connection to the application server as a response to the connection request from the internal server, the packet relay method comprising:

receiving by the internal server a packet for the terminal device from the application server;

determining by the internal server whether or not the packet received contains absolute address information for accessing a communication device present on the internal network;

changing the absolute address information to address information via the external server when the absolute address information is contained;

encrypting the received packet to be decrypted by only the terminal device after having changed the absolute address information when the absolute address information is contained, or without any change when the absolute address information is not contained;

transmitting by the internal server the encrypted packet to the external server via the firewall;

receiving by the external server the packet encrypted by the internal server; and transmitting by the external server intact the received encrypted packet to the terminal device, wherein decryption of the received encrypted packet is suppressed in the external server by changing the absolute address information.

8. The network system according 1, wherein the external server requests the terminal device to provide user information, and the external server establishes connection to the terminal device.

9. A network system comprising:

an internal network having an internal server;

an external network having a terminal device;

a gateway server relaying data between the internal server and the terminal device; and a firewall that connects the internal network to the external network, wherein the internal server determines whether or not received data contains absolute address information, and changes absolute address information to address information which the terminal device can access when the received data has the absolute address information, wherein the internal server transmits the data to the terminal device via the gateway server and the data is encrypted by the internal server in such a manner that an encrypted packet is able to be decrypted only by the terminal device, and wherein decryption of the encrypted packet is suppressed in the gateway server by changing the absolute address information.

* * * * *